UNITED STATES PATENT OFFICE.

JOHN A. EVARTS, OF WEST MERIDEN, CONNECTICUT, ASSIGNOR TO BRADLEY & HUBBARD MANUFACTURING COMPANY, OF SAME PLACE.

EXTENSION LAMP-FIXTURE.

SPECIFICATION forming part of Letters Patent No. 230,258, dated July 20, 1880.

Application filed February 2, 1880.

*To all whom it may concern:*

Be it known that I, JOHN A. EVARTS, of West Meriden, in the county of New Haven and State of Connecticut, have invented a new Improvement in Extension Lamp-Fixtures; and I do hereby declare the following, when taken in connection with the accompanying drawing and the letters of reference marked thereon, to be a full, clear, and exact description of the same, and which said drawing constitutes part of this specification, and represents a side view.

This invention relates to an improvement in lamp-fixtures designed to be suspended from the ceiling, and so that the lamp with the shade may be drawn down and supported at different elevations.

In the usual construction the weight is arranged so that the extent of movement is limited by the distance between the top of the shade and pulleys above, over which the chains run; hence in rooms of low ceiling the extension is necessarily very slight.

The object of this invention is, principally, to afford a great degree of extension in a short fixture; and it consists in the construction, as hereinafter described, and particularly recited in the claims.

A is the bar by which the fixture is suspended to the ceiling and to which the mechanism of the fixture is attached. At each side a vertical rod, B, extends downward, and to its lower end a guide, C, is fixed. These guides C extend inward, and through each passes a vertical rod, D, the two rods D being connected at their lower ends, below the guide C, by a cross-piece, E. The rods D are parallel to the rods B, and arranged so as to move up and down through the guides C. To the upper end of each of the rods D a chain, F, or its equivalent is attached. Each chain is passed over its pulley G outward, then downward between the rods B and D and to the end of each chain a weight, H, is attached, and so that when the cross-piece E is raised to its highest point the weights H will be at their lowest point, which may be at the guide C, as shown.

To the cross-piece or connecting-bar E the lamp L with its shade is secured, and so as to extend up between the rods D D.

By this construction it will be observed that the entire lamp with its shade is above the lower end of the weights, increasing thereby the run of the weights to that extent over what it would be were the run limited by the top of the shade, as in the usual or most common construction. In some constructions, however, the weight has been permitted to run to a point below the top of the shade. It is therefore not to be understood that a broad claim is here made to an arrangement of weights in extension lamp-fixture whereby the weights may run below the top of the shade.

Each weight is preferably provided with a cross-bar or ears, N, through which each of the rods pass, and so that the rods will serve as a guide for the weights in their movement up and down, and the guides C and N together serve to steady the fixture during adjustment.

Instead of the rods D, the chains may be continued down to the lamp-support; but the rods are preferable. The guides for the weights may be dispensed with without departing from this invention.

India-rubber or other cushions may with advantage be applied between the parts that come together at their highest elevation.

The form of the cross-bar A above, and of the connecting-piece E below, as well as of the other parts, may be made of different design, according to the taste of the manufacturer or the requirements of the trade, the shape of the parts being no part of this invention.

The rods may be made solid or tubular, and instead of guiding the weights by ears surrounding the rods, they may be guided by slots in the rods, or by ribs formed on the rods, or otherwise.

Instead of weights and pulleys, springs may be applied at the points where the pulleys are arranged, with cords attached to the rods D, or to the lamp-support below. I therefore wish to be understood by the term "weights" as embracing springs as an equivalent therefor.

I do not broadly claim suspending a lamp on a rod movable vertically, or so as to be adjusted relative to a stationary rod, for such I am aware is not new.

1. In an extension lamp-fixture, the combination of the vertical rods B, attached to the (Model.)
H. G. FARR.
Machine for Forming Flanges on Counter Stiffeners for Boots and Shoes.
No. 230,259.　　　　　　　　　Patented July 20, 1880.
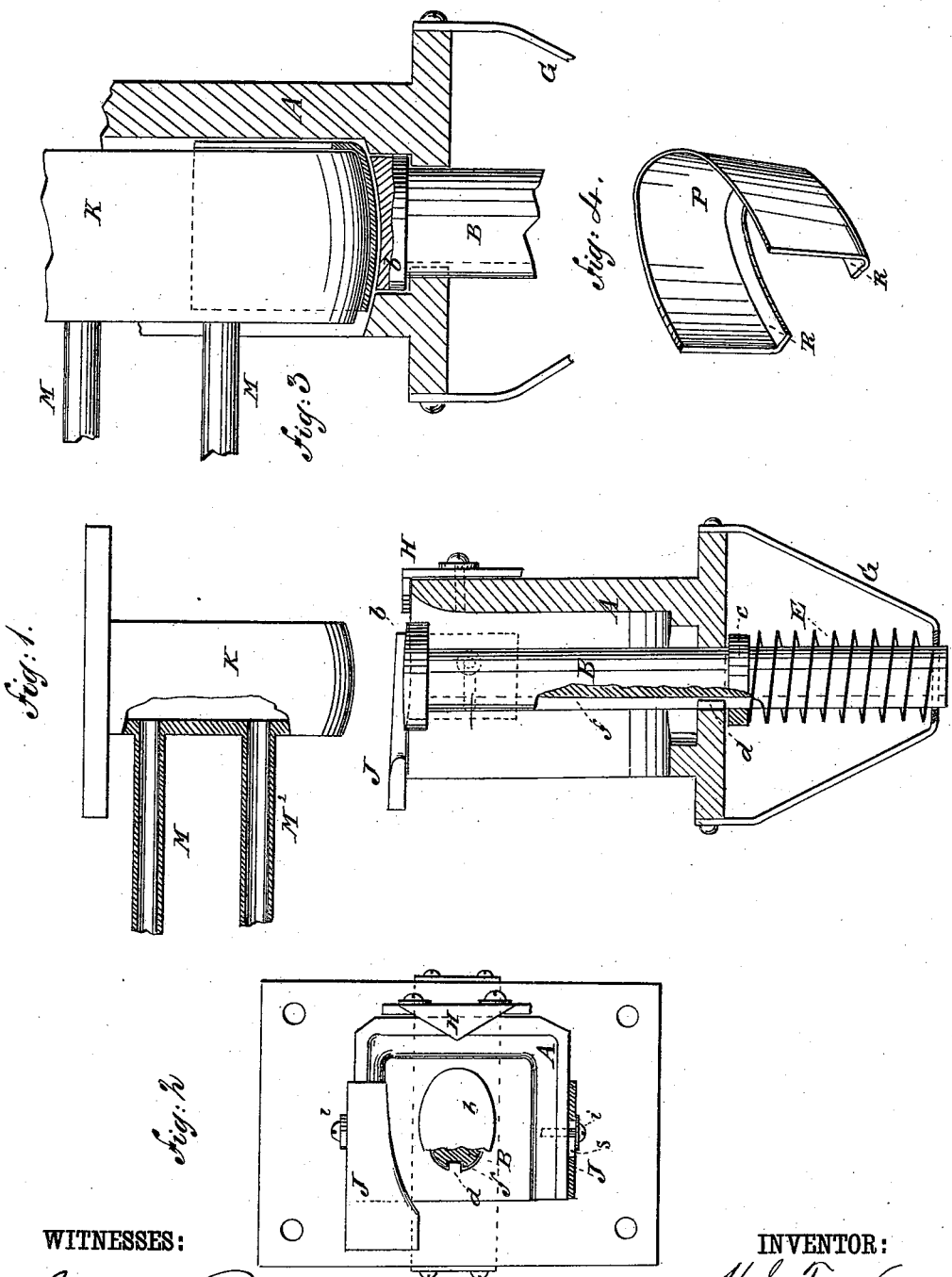

I claim—